US010641087B2

(12) United States Patent
Wilson et al.

(10) Patent No.: US 10,641,087 B2
(45) Date of Patent: May 5, 2020

(54) INDUCTIVE CAVITY SENSORS FOR RESISTIVITY TOOLS

(71) Applicant: Halliburton Energy Services, Inc., Houston, TX (US)

(72) Inventors: Glenn Andrew Wilson, Houston, TX (US); Jin Ma, Singapore (SG); Li Pan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 159 days.

(21) Appl. No.: 15/749,842

(22) PCT Filed: Oct. 28, 2015

(86) PCT No.: PCT/US2015/057795
§ 371 (c)(1),
(2) Date: Feb. 2, 2018

(87) PCT Pub. No.: WO2017/074346
PCT Pub. Date: May 4, 2017

(65) Prior Publication Data
US 2018/0223655 A1    Aug. 9, 2018

(51) Int. Cl.
*E21B 49/00* (2006.01)
*G01V 3/26* (2006.01)
*E21B 47/12* (2012.01)
*E21B 47/01* (2012.01)
*E21B 47/024* (2006.01)
*E21B 47/16* (2006.01)
*G01V 3/38* (2006.01)
*E21B 17/10* (2006.01)

(52) U.S. Cl.
CPC ............ *E21B 49/00* (2013.01); *E21B 47/011* (2013.01); *E21B 47/024* (2013.01); *E21B 47/122* (2013.01); *E21B 47/16* (2013.01); *G01V 3/26* (2013.01); *G01V 3/38* (2013.01); *E21B 17/1021* (2013.01)

(58) Field of Classification Search
CPC ........ E21B 49/00; E21B 47/024; E21B 47/16; E21B 17/1021; E21B 47/011; E21B 47/122; G01V 3/38; G01V 3/26
USPC ........................................ 324/346, 345, 323
See application file for complete search history.

(56) References Cited

U.S. PATENT DOCUMENTS

| 766,337 A | 8/1904 | Folger |
| 5,235,285 A * | 8/1993 | Clark .................. E21B 17/1078 324/342 |

(Continued)

FOREIGN PATENT DOCUMENTS

| WO | 8401439 A1 | 4/1984 |
| WO | 2017065722 A1 | 4/2017 |

OTHER PUBLICATIONS

European Patent Office, Supplementary European Search Report and European Search Opinion, dated Aug. 16, 2018, Munich, Germany.

(Continued)

*Primary Examiner* — Giovanni Astacio-Oquendo
(74) *Attorney, Agent, or Firm* — Gilliam IP PLLC

(57) ABSTRACT

A first magnetic cavity transmitter is in the conductive tool body. A first magnetic cavity receiver is in the conductive tool body. A first transmit module is coupled to the first magnetic cavity transmitter. A first receiver module is coupled to the first magnetic cavity receiver.

17 Claims, 6 Drawing Sheets

(56) References Cited

U.S. PATENT DOCUMENTS

| | | | |
|---|---|---|---|
| 5,530,358 A | 6/1996 | Wisler et al. | |
| 5,757,186 A | 5/1998 | Taicher et al. | |
| 6,100,696 A | 8/2000 | Sinclair | |
| 5,160,925 C1 | 3/2001 | Dailey et al. | |
| 6,392,561 B1 | 5/2002 | Davies et al. | |
| 6,703,833 B2 * | 3/2004 | Wisler | G01N 24/081 |
| | | | 324/303 |
| 7,091,722 B2 | 8/2006 | Homan et al. | |
| 7,239,145 B2 | 7/2007 | Homan et al. | |
| 7,277,026 B2 | 10/2007 | Hall et al. | |
| 7,385,400 B2 | 6/2008 | Moore | |
| 7,436,183 B2 | 10/2008 | Clark | |
| 7,583,085 B2 | 9/2009 | Hall et al. | |
| 8,174,265 B2 | 5/2012 | Bittar et al. | |
| 8,212,568 B2 | 7/2012 | Morys et al. | |
| 8,222,902 B2 | 7/2012 | Bittar et al. | |
| 8,264,228 B2 | 9/2012 | Bittar et al. | |
| 8,378,908 B2 | 2/2013 | Wisler et al. | |
| 8,400,160 B2 | 3/2013 | Fredette et al. | |
| 8,471,563 B2 | 6/2013 | Wisler et al. | |
| 8,604,796 B2 | 12/2013 | Wisler et al. | |
| 8,638,092 B2 | 1/2014 | Rajula et al. | |
| 8,844,648 B2 | 9/2014 | Bittar et al. | |
| 8,890,531 B2 | 11/2014 | Beste et al. | |
| 9,000,873 B2 | 4/2015 | Deville et al. | |
| 2006/0208738 A1 | 9/2006 | Moore | |
| 2009/0179648 A1 | 7/2009 | Fredette et al. | |
| 2009/0302851 A1 * | 12/2009 | Bittar | E21B 47/026 |
| | | | 324/338 |
| 2011/0316542 A1 | 12/2011 | Frey et al. | |
| 2013/0197627 A1 * | 8/2013 | Jensen | A61F 2/07 |
| | | | 623/1.35 |
| 2014/0136114 A1 * | 5/2014 | Liu | G01V 3/28 |
| | | | 702/7 |
| 2014/0240074 A1 | 8/2014 | Qui et al. | |
| 2014/0292341 A1 | 10/2014 | Yang | |
| 2014/0340089 A1 | 11/2014 | Rodney | |
| 2015/0145524 A1 * | 5/2015 | Duncan | G01R 31/024 |
| | | | 324/538 |
| 2016/0054370 A1 * | 2/2016 | Fomin | G01R 31/025 |
| | | | 324/509 |
| 2016/0178689 A1 * | 6/2016 | Okita | G01R 31/024 |
| | | | 324/509 |

OTHER PUBLICATIONS

International Searching Authority, Patent Cooperation Treaty, International Search Report and the Written Opinion, International application No. PCT/US2015/057795, entire document, which is a PCT parent of the instant application, dated Jul. 26, 2016.

EP Application Serial No. 15907449.1; Communication Pursuant to Article 94(3); dated Feb. 26, 2020, 4 pages.

* cited by examiner

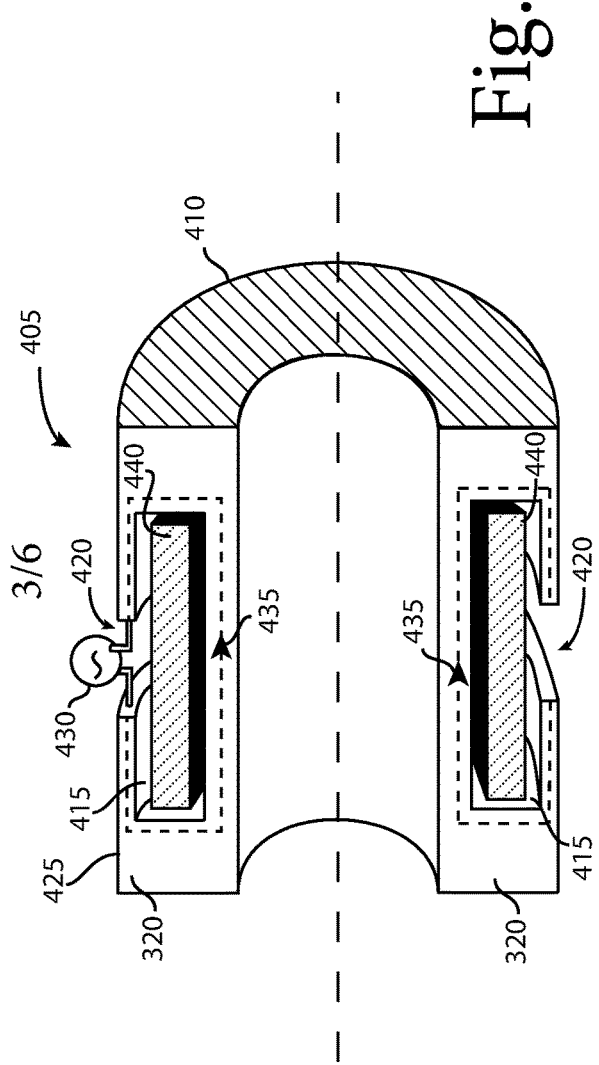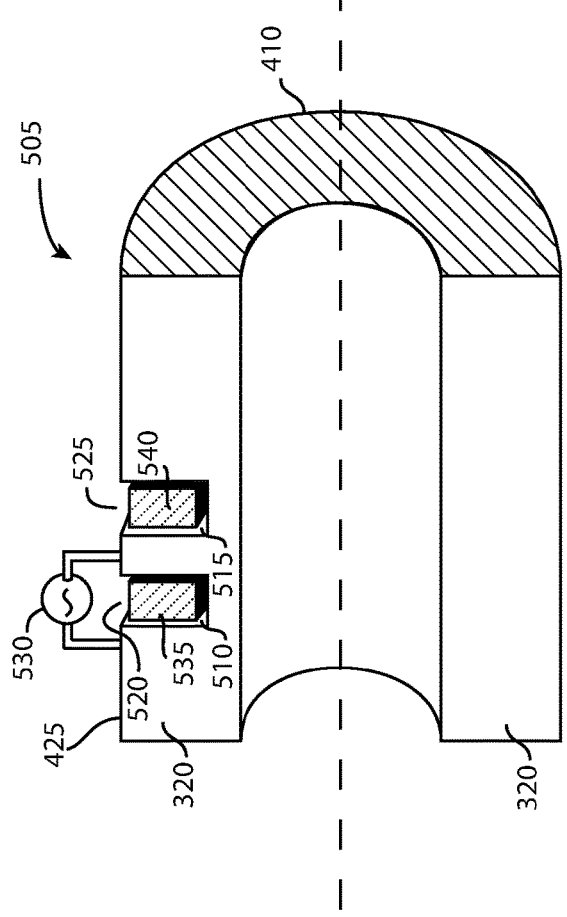

INDUCTIVE CAVITY SENSORS FOR RESISTIVITY TOOLS

BACKGROUND

In logging-while-drilling (LWD) and measurement-while-drilling systems for use in the oil field, sensors may be used in resistivity tools and imaging systems. Manufacturing mechanically durable sensors to withstand harsh borehole environments is a challenge.

BRIEF DESCRIPTION OF THE DRAWINGS

FIG. 4 is a cross-sectional view of a magnetic cavity transmitter on a drill collar.

FIG. 5 is a cross-sectional view of a magnetic cavity receiver on a drill collar.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

Further, while this disclosure describes a land-based production system, it will be understood that the equipment and techniques described herein are applicable in sea-based systems, multi-lateral wells, all types of production systems, all types of rigs, wired drillpipe environments, coiled tubing (wired and unwired) environments, wireline environments, and similar environments.

Figure 1:
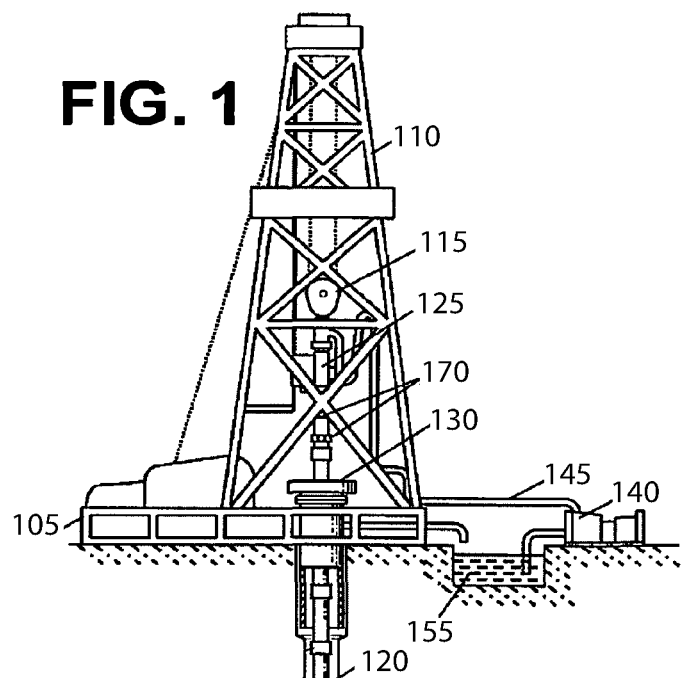
FIG. 1 is an elevation view of an illustrative logging while drilling (LWD) or measurement while drilling (MWD) environment.

The disclosed tool configurations and operations are best understood in the context of the larger systems in which they operate. Accordingly, an illustrative LWD or MWD environment is shown in FIG. 1. A drilling platform 105 is equipped with a derrick 110 that supports a hoist 115 for raising and lowering a drill string 120. The hoist 115 suspends a top drive 125 that is used to rotate the drill string 120 and to lower the drill string through the well head 130. Connected to the lower end of the drill string 120 is a drill bit 135. The bit 135 is rotated and drilling is accomplished by rotating the drill string 120, by use of a downhole motor near the drill bit, or by both methods. Drilling fluid, termed "mud", is pumped by mud recirculation equipment 140 through supply pipe 145, through top drive 125, and down through the drill string 120 at high pressures and volumes to emerge through nozzles or jets in the drill bit 135. The mud then travels back up the hole via an annulus formed between the exterior of the drill string 120 and the borehole wall 150, through a blowout preventer (not specifically shown), and into a mud pit 155 on the surface. On the surface, the drilling mud is cleaned and then recirculated by recirculation equipment 140. The drilling mud is used to cool the drill bit 135, to carry cuttings from the base of the bore to the surface, and to balance the hydrostatic pressure in the rock formations.

In wells employing acoustic telemetry for LWD or MWD, downhole sensors (including a resistivity logging tool 160) are coupled to an acoustic telemetry transmitter 165 that transmits telemetry signals in the form of acoustic vibrations in the tubing wall of drill string 120. An acoustic telemetry receiver array 170 may be coupled to tubing below the top drive 125 to receive transmitted telemetry signals. One or more repeater modules 175 may be optionally provided along the drill string to receive and retransmit the telemetry signals. The repeater modules 175 include both an acoustic telemetry receiver array and an acoustic telemetry transmitter configured similarly to receiver array 170 and the transmitter 165.

The electromagnetic resistivity logging tool 160 may be integrated into the bottom hole assembly near the bit 135. As the bit extends the borehole through the formations, downhole sensors collect measurements relating to various formation properties as well as the tool orientation and position and various other drilling conditions. The orientation measurements may be performed using an azimuthal orientation indicator, which may include magnetometers, inclinometers, and/or accelerometers, though other sensor types such as gyroscopes may be used. In some embodiments, the tool includes a 3-axis fluxgate magnetometer and a 3-axis accelerometer. Electromagnetic resistivity logging tool 160 may take the form of a drill collar, i.e., a thick-walled tubular that provides weight and rigidity to aid the drilling process.

Figure 2:
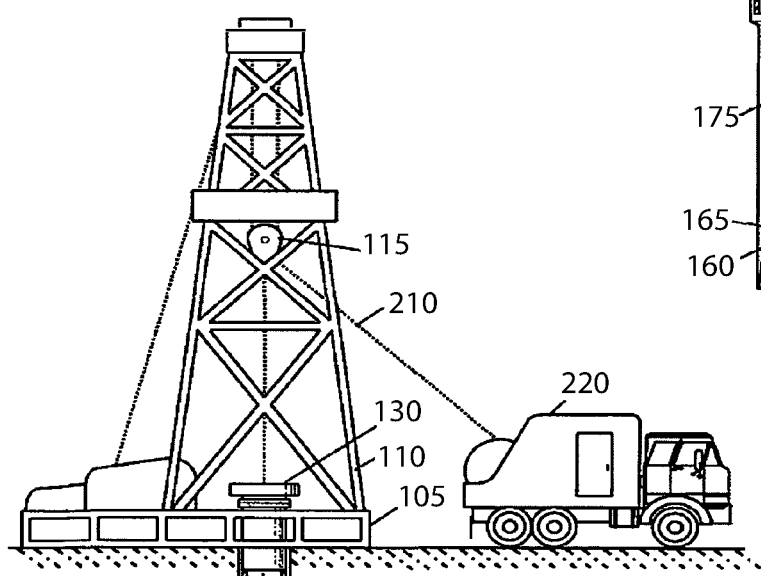
FIG. 2 is an elevation view of an illustrative wireline logging environment.

At various times during the drilling process, the drill string 120 may be removed from the borehole as shown in FIG. 2. Once the drill string has been removed, logging operations can be conducted using a wireline logging tool 205, i.e., a sensing instrument sonde suspended by a cable 210 having conductors for transporting power to the tool and telemetry from the tool to the surface. A resistivity imaging portion of the logging tool 205 may have centralizing arms 215 that center the tool within the borehole as the tool is pulled uphole. The centralizing arms 215 may be equipped with sensor pads that are maintained in close contact with the borehole wall to gather logging data. A logging facility 220 collects measurements from the logging tool 210, and includes computing facilities for processing and storing the measurements gathered by the logging tool.

Figure 3:
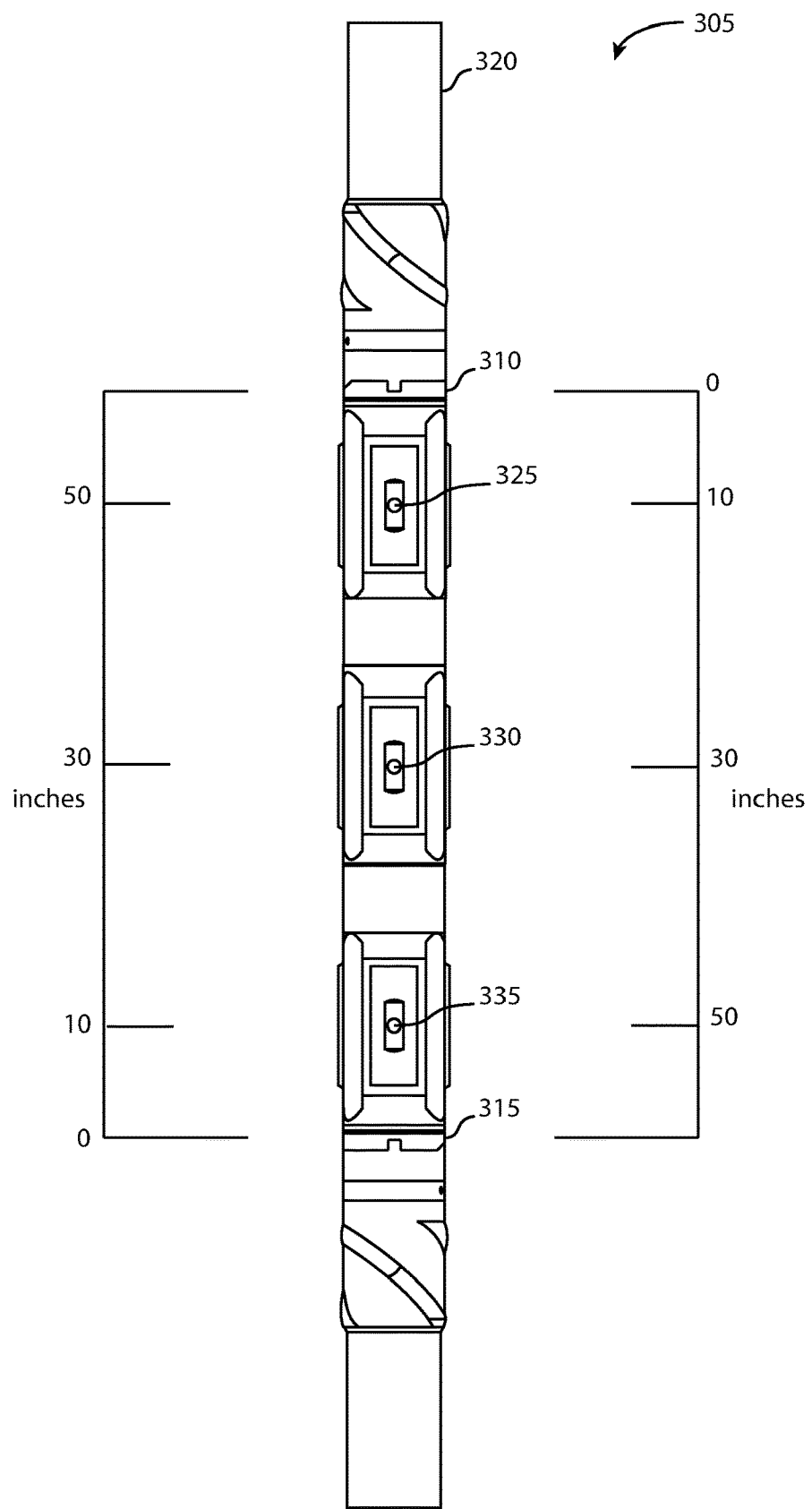
FIG. 3 is a plan view of an electromagnetic resistivity logging tool.

FIG. 3 is a plan view of an electromagnetic resistivity logging tool, which by way of example is illustrated in FIG. 3 as an Azimuthal Focused Resistivity (AFR) tool 305 available from Halliburton. The AFT tool 305 in this example includes a symmetric set of two toroid transmitters 310, 315 mounted on a tool body 320 and nine axially and azimuthally distributed button electrode receivers mounted about the tool body 320 (only button electrode receivers 325, 330 and 335 are labeled and visible; the other electrode receivers arranged around the tool body 320 are not visible in FIG. 3). The AFR tool 305 operates at two frequencies: 4 kiloHertz (kHz) and 36 kHz.

The distance scales on the left and right sides of FIG. 3 illustrate an example of the AFR tool which is provided for illustration purposes and should not be seen as limiting the claims. The distance scale on the left side of Fig. provides approximate distances (i.e., within 0.5 inches, 1 inch, or 5 inches) from the lower toroid transmitter 315 to the button electrode receivers 325, 330, and 335. The distance scale on the right side of FIG. 1 provides approximate distances (i.e., within 0.5 inches, 1 inch, or 5 inches) from the upper toroid transmitter 310 and the button electrode receivers 325, 330, and 335.

The distance between toroid transmitter 310 and button electrode receiver 325 is 10 inches. The distance between toroid transmitter 310 and button electrode receiver 330 is 30 inches. The distance between toroid transmitter 310 and button electrode receiver 335 is 50 inches.

The distance between toroid transmitter 315 and button electrode receiver 335 is 10 inches. The distance between toroid transmitter 315 and button electrode receiver 330 is 30 inches. The distance between toroid transmitter 315 and button electrode receiver 325 is 50 inches.

The distance between the two electrode transmitters 310 along the tool body 320 is 60 inches. The distance between any two consecutive button electrode receivers 325, 330, 335 along the tool body 320 is 20 inches.

In one or more embodiments, as illustrated in FIGS. 4 and 5, the toroid transmitters 310, 315 and the button electrodes receivers 325, 330, 335 in the conventional electromagnetic resistivity logging tool 305 are replaced with magnetic cavity transmitters 405 (shown in FIG. 4, discussed below) and magnetic cavity receivers 505 (shown in FIG. 5, discussed below), respectively. The magnetic cavity transmitters 405 and magnetic cavity receivers 505 may be placed on a drill collar 415. The magnetic cavity transmitters 405 and magnetic cavity receivers 505 may provide the durability to handle rotation, vibration, corrosion and other harsh environments often present in downhole applications.

FIG. 4 is a cross-sectional view of a magnetic cavity transmitter 405 on a drill collar. To create the magnetic cavity transmitter 405, as shown in FIG. 4, a cavity 415 is formed in the tool body 320. The word "formed" in this context is defined to mean that (1) the cavity 415 is created by leaving a void in the tool body 320 when the tool body 320 is cast, rolled, or otherwise created, or (2) the cavity 415 is milled into, cut into, etched from, or otherwise excavated from the tool body 320 after the tool body is created. The cavity 415 encircles the tool body 320. The cavity 415 may be elliptical, rectangular or conical in cross-sectional shape (i.e., the cross-section shown in FIG. 4). A gap 420 is cut around the tool body 320 along the cavity 415. The gap 420 encircles the tool body 320 and electromagnetically couples the cavity 415 to an external surface 425 of the tool body 320. In one or more embodiments, the gap 420 is smaller than the width of the cavity 415. In one or more embodiments, the gap 420 is equal to the width of the cavity 415.

A voltage/current source 430 is coupled across the gap 420. The voltage/current source 430 generates a current (indicated by the dashed arrow 435 in FIG. 4) which flows about the cavity 420. While the direction of the current is shown as counterclockwise, it will be understood that the direction of current flow is determined by the polarity of the voltage imposed by the voltage/current source 430 across the gap 420. The voltage/current source 430 may be a direct current (DC) source. The voltage/current source 430 may be an alternating current (AC) source. In one or more embodiments, the voltage/current source 430 generates a transmit signal that includes a carrier frequency. In one or more embodiments, the carrier frequency is one of 4 kilohertz and 36 kilohertz. In one or more embodiments, the tool body 320 has an impedance between opposite sides of the gap 420 with a magnitude in excess of 1 ohm at the carrier frequency.

A magnetic core material 440 is placed within the cavity 415. The magnetic core material 440 may include but is not limited to ferrites (e.g., ceramics or impregnated composites), mu-metal, permalloy, or metallic glass (metglass) and has high magnetic permeability and low magnetic loss (e.g., hysteresis, magnetostriction). The magnetic core material 440 fills a portion (more than 80 percent, 90 percent, or 95 percent) of the cavity 415. Insulating material (e.g., polyether ether ketone (PEEK), ceramic, and/or similar materials) fills some or all of the remaining portion of the cavity 415 and insulates the magnetic core material 440 within the cavity 415. Note, for clarity of presentation, the insulating material is not illustrated in FIG. 4.

FIG. 5 is a cross-sectional view of a magnetic cavity receiver 505 on a drill collar. To create the magnetic cavity receiver 505, as shown in FIG. 5, one or more cavities 510, 515 are formed in the tool body 320. The word "formed" in this context is defined to mean that (1) the cavities 510, 515 are created by leaving voids in the tool body 320 when the tool body 320 is cast, rolled, or otherwise created, or (2) the cavities 510, 515 are milled into, cut into, etched from, or otherwise excavated from the tool body 320 after the tool body is created. The cavities 510, 515 may be elliptical, rectangular or conical in cross-sectional shape (i.e., the cross-section shown in FIG. 5). Gaps 520, 525 are cut into the tool body 320 from the external surface 425 of the tool body 320 into the respective cavities 510, 515. The gaps 520, 525 electromagnetically couple the respective cavities 510, 515 to the external surface of the tool body 320. The shape of the gaps 520, 525 in the external surface of the tool body 320 may be elliptical (including circular) or rectangular (including square). In one or more embodiments, the gaps 520, 525 are smaller than the width of their respective cavities 510, 515. In one or more embodiments, the gaps 520, 525 are equal to the width of their respective cavities 510, 515.

A voltage sensor 530 is coupled across one of the gaps 520, 525. The voltage sensor 530 measures voltage across the gap 520 induced by magnetic fields in the tool body 320. Magnetic core materials 535, 540, similar in composition to magnetic core material 440 described in connection with FIG. 4, are placed in the cavities 510, 515 to increase the sensitivity of the magnetic cavity receiver 505 to magnetic fields. The magnetic core materials 535, 540 fill a portion (more than 80 percent, 90 percent, or 95 percent) of their respective cavities 510, 515. Insulating material, similar in composition and purpose to the insulating material used in the magnetic cavity transmitter, fill some or all of the remaining portion of the cavities 510, 515. Again, for simplicity of presentation, the insulating material is not shown in FIG. 5.

For sensing, the voltage across the magnetic cavity 520 can be applied across the terminals of a high impedance load, such as a 1 mega-ohm (MΩ) resistor (not shown). This ensures the transfer function for the voltage across the magnetic cavity sensor 505 to the voltage across the high impedance load is 1 for any formation resistivity. The terminals of the high impedance load can be part of a pre-amplifier circuit, for subsequent signal and processing.

The devices illustrated in FIGS. 4 and 5 are optionally reciprocal in function. That is, the magnetic cavity transmitter 405 can be converted to a magnetic cavity receiver by replacing the voltage/current source 430 with a voltage sensor. Similarly, the magnetic cavity receiver 505 can be converted to a magnetic cavity transmitter by replacing the voltage sensor 530 with a voltage/current source. A transmitter or receiver configured as in FIG. 4 emulates (where emulate is defined for the purposes of this disclosure to mean "reproduces the function and characteristics of"), a toroid transmitter 315 or toroid receiver (not shown). A transmitter or receiver configured as in FIG. 5 emulates a button electrode 325, 330, 335) or a button transmitter.

As is known, magnetic cavity transmitters 405 and magnetic cavity receivers 505 operate by applying or measuring a potential across a dielectric cavity occupied by a magnetic core (such as magnetic core materials 440, 535, 540). In making resistivity measurements, the inductive cavity transmitters 405 generate magnetic fields that interact with a surrounding formation and is detected by the inductive cavity receivers 410. The magnetic field received by the inductive cavity receivers 410 can be analyzed to determine properties, such as resistivity, of the surrounding formation.

Figure 6:
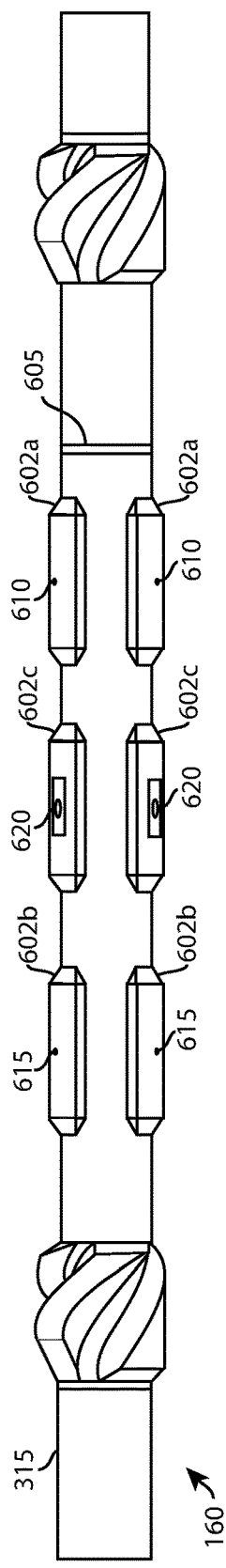
FIG. 6 is a plan view of an electromagnetic resistivity logging tool with a magnetic cavity transmitter and with magnetic cavity receivers.

FIG. 6 illustrate an example of an electromagnetic resistivity logging tool 160 with the magnetic cavity transmitter 405 illustrated in FIG. 4 and the magnetic cavity receivers 505 illustrated in FIG. 5. The electromagnetic resistivity logging tool 160 includes three sets of stabilizers 602a, 602b, and 602c (only two of the stabilizing in each set are visible), a magnetic cavity transmitter 605, similar to magnetic cavity transmitter 405, two sets of three magnetic small cavity receivers 610, 615 (only two of the three receivers in each set are visible) in the stabilizers 602a and 602b, respectively, and one set of three magnetic big cavity receivers 620 (only two of the four receivers are visible) in the stabilizers 602c.

Figure 7:
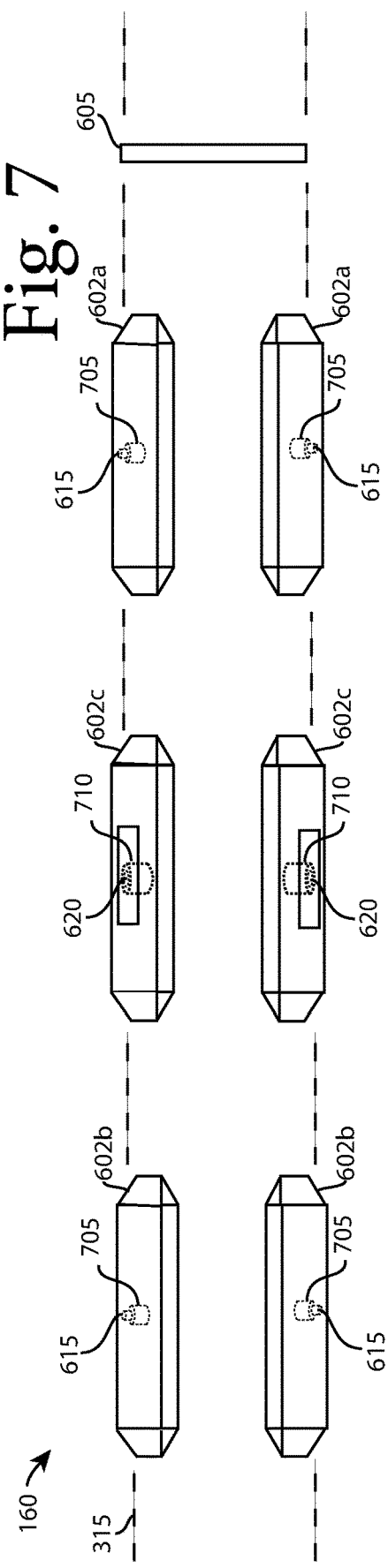
FIG. 7 is a semi-transparent plan view of an electromagnetic resistivity logging tool with a magnetic cavity transmitter and with magnetic cavity receivers.

FIG. 7 is a semi-transparent view of the tool illustrated in FIG. 6. The description of the magnetic cavity receivers as "big" 620 and "small" 610, 615 is a reference to the cross-sectional area of the small cavity 705 formed in the small cavity receivers 610, 615 and the big cavity 710 formed in the big cavity receiver 710, as shown in FIG. 7. The resolution of the magnetic cavity sensors 610, 615, 620 is proportionate to the cross-sectional area of the cavities 705, 710. In one or more embodiments, the small cavities 705 are 1.25 inches in diameter and the large cavities 710 are 1.46 inches in diameter. The magnetic small cavity receiver 620 has finer resolution than the magnetic big cavity receiver 620.

In one or more embodiments, the tool body 320 is a non-magnetic steel alloy (e.g., Inconel) with a conductivity of 7×10$^6$ S/m. In one or more embodiments, the insulating material has a dielectric constant of 20 and a resistivity of 5×10$^{18}$ Ωm.

In one or more embodiments, magnetic cavity transmitters 405 replace the toroidal transmitters 310, 315 in the AFR tool shown in FIG. 3, avoiding the necessity to wind coils about magnetic cores. Rather, the magnetic cavity 420 can be formed by machining a grove into the tool body 320, and the cavities 420 can be appropriately filled with insulating and magnetic core materials 440. The gap 425 can be introduced by a slot in a metallic cover (not shown).

In one or more embodiments, magnetic cavity receivers 505 replace the button electrodes 325, 330, 335 in the AFR tool shown in FIG. 3, avoiding the complexity of guard electrodes and insulation of the button electrodes 325, 330, 335 from the tool body 320. Rather, the magnetic cavity or cavities 520, 525 can be machined into the tool body 320, and then the magnetic cavity or cavities 520, 525 can be appropriately filled with insulating and magnetic core materials 535, 540. The gap or gaps 520, 525 can be introduced by a slot in a metallic cover (not shown).

Figure 8:
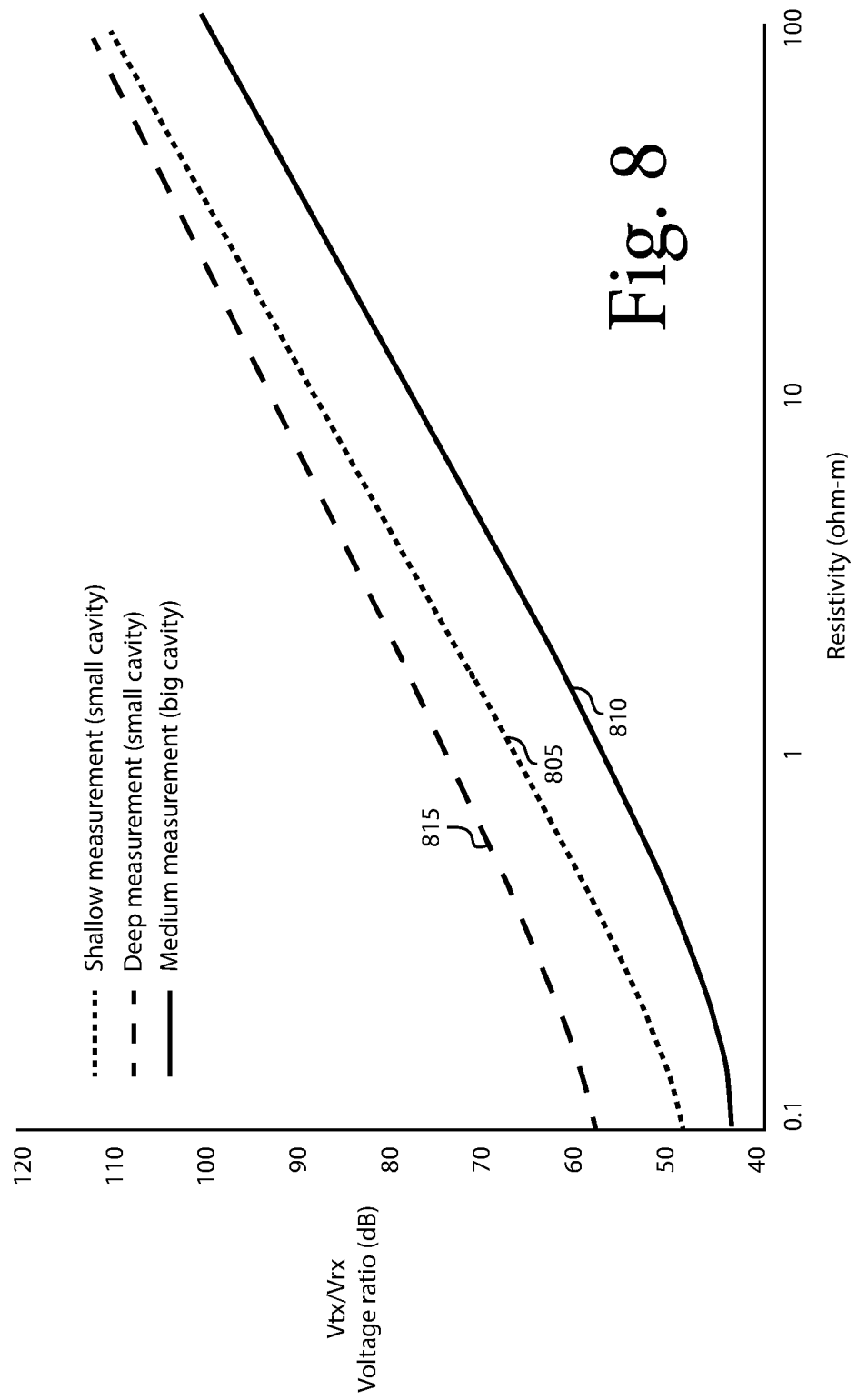
FIG. 8 is a chart illustrating a simulation of the transmitter-receiver voltage ratio (Vtx/Vrx) for shallow, medium and deep resistivity measurements in uniform formations for the electromagnetic resistivity logging tool of FIGS. 6 and 7.

FIG. 8 is a chart illustrating a simulation of the transmitter-receiver voltage ratio (Vtx/Vrx) for shallow, medium and deep resistivity measurements in uniform formations for the electromagnetic resistivity logging tool of FIGS. 6 and 7. The simulation is run with a transmitter voltage of 0.05 Volts (V) at 4 kHz) resulting in transmitter-receiver voltage ratio (Vtx/Vrx) for shallow 805, medium 810, and deep 815 resistivity measurements in uniform formations. It will be understood that the response of the sensors 610, 615, 620 are expressed as being shallow, medium, and deep, with "shallow" corresponding to the shortest transmitter-receiver spacing (e.g., magnetic cavity transmitter 605 to magnetic small cavity receiver 610), "deep" corresponding to the longest transmitter-receiver spacing (e.g. magnetic cavity transmitter 605 to small cavity receiver 615), and "medium" corresponding to an intermediate transmitter-receiver spacing (i.e., magnetic cavity transmitter 605 to magnetic big cavity receiver 620). Note that the voltage ratio is substantially linear (on the log-log scale being used) above 1 ohm-meter (ohm-m) formation resistivity; and is quasi-linear below 1 ohm-m formation resistivity. As can be seen, there is a quasi-linear response to the transmitter-receiver voltage ratio as a function of formation resistivity. Thus, formation resistivity measurements are possible without having to measure current in either the transmitter or receiver. In one or more embodiments, an impedance transfer function can be derived from the ratio of transmitted currents and measured voltages.

The tool can be operated with two transmitters symmetric about the receivers such that the tool produces compensated measurements. The method can be operated at multiple frequencies, whether simultaneously or sequentially. Measured data may be subsequently processed for borehole-effect and or skin-effect corrections.

Figure 9:
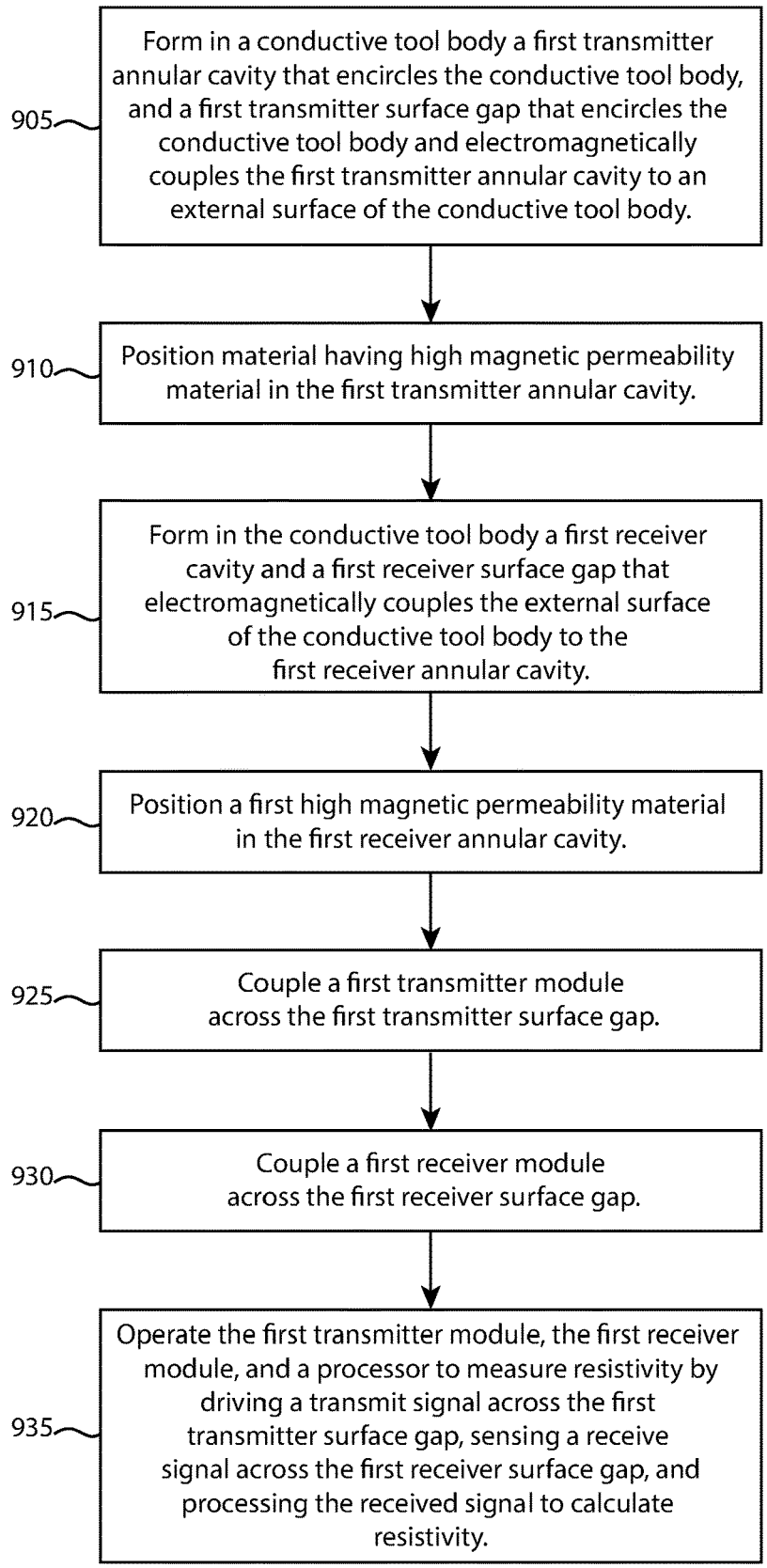
FIG. 9 is a flow chart showing creation and use of a tool with a magnetic cavity transmitter and a magnetic cavity receiver.

FIG. 9 is a flow chart showing creation and use of a tool with a magnetic cavity transmitter and a magnetic cavity receiver. A first transmitter annular cavity (such as cavity 415) is formed (e.g., by milling) that encircles the conductive tool body (such as tool body 320), and a first transmitter surface gap (such as gap 420) is formed that encircles the conductive tool body (such as tool body 320) and electromagnetically couples the first transmitter annular cavity (such as cavity 415) to an external surface of the conductive tool body (such as the external surface 425 of the tool body 320) (block 905).

A material (such as magnetic core material 440) having high magnetic permeability material is positioned in the first transmitter annular cavity (such as cavity 420) (block 910).

A first receiver cavity (such as cavity 510 or cavity 515) is formed in the conductive tool body (such as tool body 320) and a first receiver surface gap (such as gap 520 or gap 525) is formed in the conductive tool body (such as tool body 320) that electromagnetically couples the external surface of the conductive tool body (such as the external surface 425 of the tool body 320) to the first receiver annular cavity (such as cavity 510 or cavity 515) (block 915).

A first high magnetic permeability material (such as magnetic core material 440) is positioned in the first receiver annular cavity (such as cavity 420) (block 920).

A first transmitter module (such as voltage/current source 430) is coupled across the first transmitter surface gap (such as gap 420) (block 925).

A first receiver module (such as voltage sensor 530) is coupled across the first receiver surface gap (such as gap 520 or gap 525) (block 930).

The first transmitter module (such as voltage/current source 430), the first receiver module (such as voltage sensor 530), and a processor are operated to measure resistivity by driving a transmit signal (using, for example, voltage/current source 430) across the first transmitter surface gap (such as gap 420), sensing a receive signal (using, for example, voltage sensor 530) across the first receiver surface gap (such as gap 520 or gap 525), and processing the received signal to calculate resistivity (block 930).

In one aspect, an apparatus includes a conductive tool body. A first magnetic cavity transmitter is in the conductive tool body. A first magnetic cavity receiver is in the conductive tool body. A first transmit module is coupled to the first magnetic cavity transmitter. A first receiver module is coupled to the first magnetic cavity receiver.

Implementations may include one or more of the following. The magnet cavity transmitter may emulate a toroid transmitter and the magnetic cavity receiver may emulate a button electrode. A second magnetic cavity transmitter may be in the conductive tool body. A second transmit module may be coupled to the second magnetic cavity transmitter. A second magnetic cavity receiver may be in the conductive tool body. A second receive module may be coupled to the second magnetic cavity receiver. The first magnetic cavity receiver may include a first receiver cavity and the second magnetic cavity receiver may include a second receiver cavity. The first receiver cavity may be a large cavity and the second receiver cavity may be a small cavity. The apparatus may include a second magnetic cavity transmitter in the conductive tool body, a second magnetic cavity receiver in the conductive tool body, a second transmit module coupled to the second magnetic cavity transmitter, and a second receive module coupled to the second magnetic cavity receiver. The first magnetic cavity receiver and the second magnetic cavity receiver may be longitudinally between the first magnetic cavity transmitter and the second magnetic cavity transmitter on the conductive tool body. The first magnetic cavity transmitter and the second magnetic cavity transmitter may be symmetrically located around the first magnetic cavity receiver and the second magnetic cavity receiver. The apparatus may include a processor coupled to the first receiver module to calculate resistivity based on a signal received from the first receiver module.

In one aspect, an apparatus includes a conductive tool body. The conductive tool body may include a first transmitter that includes a first transmitter annular cavity that encircles the conductive tool body, a first transmitter surface gap that encircles the conductive tool body and electromagnetically couples the first transmitter annular cavity to an external surface of the conductive tool body, and a first transmitter ring of high magnetic permeability material in the first transmitter annular cavity. The conductive tool body my include a first receiver that includes a first receiver cavity, a first receiver surface gap that electromagnetically couples the external surface of the conductive tool body to the first receiver annular cavity, and a first high magnetic permeability material in the first receiver annular cavity. The apparatus may include a first transmitter module coupled to opposite sides of the first transmitter surface gap to induce an electric current around the first transmitter annular cavity. The apparatus may include a first receiver module coupled to opposite sides of the first receiver surface gap to detect currents induced around the first receiver annular cavity.

Implementations may include one or more of the following. The conductive tool body may include a second transmitter that includes a second transmitter annular cavity that encircles the conductive tool body, a second transmitter surface gap that encircles the conductive tool body and electromagnetically couples the second transmitter annular cavity to the external surface of the conductive tool body, and a second transmitter ring of high magnetic permeability material in the second transmitter annular cavity. The apparatus may include a second transmitter module coupled to opposite sides of the second transmitter surface gap to induce an electric current around the second transmitter annular cavity. The apparatus may include a second receiver that includes a second receiver cavity, a second receiver surface gap that electromagnetically couples the external surface of the conductive tool body to the second receiver cavity, and a second high magnetic permeability material in the second receiver annular cavity. The apparatus may include a second receiver module coupled to opposite sides of the second receiver surface gap to detect currents induced around the second receiver annular cavity. The conductive tool body may include a second transmitter that includes a second transmitter annular cavity that encircles the conductive tool body, a second transmitter surface gap that encircles the conductive tool body and electromagnetically couples the second transmitter annular cavity to the external surface of the conductive tool body, and a second transmitter ring of high magnetic permeability material in the second transmitter annular cavity. The conductive tool body may include a second receiver that includes a second receiver cavity, a second receiver surface gap that electromagnetically couples the external surface of the conductive tool body to the second receiver annular cavity, and a second receiver ring of high magnetic permeability material in the second receiver annular cavity. The apparatus may include a second transmitter module coupled to opposite sides of the second transmitter surface gap to induce an electric current around the second transmitter annular cavity. The apparatus may include a second receiver module coupled to opposite sides of the second receiver surface gap to detect currents induced around the second receiver annular cavity. The first receiver annular cavity may be a large cavity and the second receiver annular cavity may be a small cavity, wherein the large cavity is at least 10 percent larger than the small cavity. The first receiver and the second receiver may be longitudinally between the first transmitter and the second transmitter on the conductive tool body. The first transmitter and the second transmitter may be symmetrically located around the first receiver and the second receiver. The apparatus may include a processor coupled to the first receiver module to calculate resistivity based on a signal received from the first received from the first receiver module. The first receiver module may include a high impedance load. The first transmitter surface gap may be a slot in a metallic cover. The first receiver surface gap may be a slot in a metallic cover.

In one aspect, a method includes forming in a conductive tool body a first transmitter annular cavity that encircles the conductive tool body and a first transmitter surface gap that encircles the conductive tool body and electromagnetically couples the first transmitter annular cavity to an external surface of the conductive tool body. The method includes positioning a first transmit material having a high magnetic permeability material in the first transmitter annular cavity. The method includes forming in the conductive tool body a first receiver cavity and a first receiver surface gap that electromagnetically couples the external surface of the conductive tool body to the first receiver annular cavity. The method includes positioning a first receive material having a high magnetic permeability in the first receiver annular cavity. The method includes coupling a first transmitter module across the first transmitter surface gap and coupling a first receiver module across the first receiver surface gap. The method includes operating the first transmitter module, the first receiver module, and a processor to measure resistivity by driving a transmit signal across the first transmitter surface gap, sensing a receive signal across the first receiver surface gap, and processing the received voltage signal to calculate resistivity.

Implementations may include one or more of the following. The first transmit material may form a ring. The transmit signal may include a carrier frequency at a frequency selected from the group consisting of 4 kilohertz and 36 kilohertz. The conductive tool body may have an impedance between opposite sides of the first transmitter surface gap with a magnitude in excess of 1 ohm. The method may include forming in the conductive tool body a second transmitter annular cavity that encircles the conductive tool body, and a second transmitter surface gap that encircles the conductive tool body and electromagnetically couples the second transmitter annular cavity to an external surface of the conductive tool body. The method may include forming in the conductive tool body a second receiver cavity, and a second receiver surface gap that electromagnetically couples the external surface of the conductive tool body to the second receiver annular cavity. The method may include forming in the conductive tool body a second transmitter annular cavity that encircles the conductive tool body and a second transmitter surface gap that encircles the conductive tool body and electromagnetically couples the second transmitter annular cavity to an external surface of the conductive tool body. The method may include forming in the conductive tool body a second receiver cavity and a second receiver surface gap that electromagnetically couples the external surface of the conductive tool body to the second receiver annular cavity. The first receiver cavity and the second receiver cavity may be longitudinally between the first transmitter annular cavity and the second transmitter annular cavity on the conductive tool body. The first transmitter annular cavity and the second transmitter annular cavity may be symmetrically located around the first receiver cavity and the second receiver cavity. The method may include coupling a processor to the first receiver module to calculate resistivity based on a signal received from the first received from the first receiver module. The first receiver module includes a high impedance load.

In one aspect, a system includes a bottom hole assembly including a conductive tool body. The conductive tool body includes a first transmitter that includes a first transmitter annular cavity that encircles the conductive tool body, a first transmitter surface gap that encircles the conductive tool body and electromagnetically couples the first transmitter annular cavity to an external surface of the conductive tool body, and a first transmitter ring of high magnetic permeability material in the first transmitter annular cavity. The conductive tool body includes a first receiver that includes a first receiver cavity, a first receiver surface gap that electromagnetically couples the external surface of the conductive tool body to the first receiver annular cavity, and a first receiver high magnetic permeability material in the first receiver annular cavity. The system includes a first transmitter module coupled to opposite sides of the first transmitter surface gap to induce an electric current around the first transmitter annular cavity. The system includes a first receiver module coupled to opposite sides of the first receiver surface gap to detect currents induced around the first receiver annular cavity.

Implementations may include one or more of the following. The conductive tool body may include a second transmitter that includes a second transmitter annular cavity that encircles the conductive tool body, a second transmitter surface gap that encircles the conductive tool body and electromagnetically couples the second transmitter annular cavity to the external surface of the conductive tool body, and a second transmitter ring of high magnetic permeability material in the second transmitter annular cavity. The system may include a second transmitter module coupled to opposite sides of the second transmitter surface gap to induce an electric current around the second transmitter annular cavity. The system may include a second receiver that includes a second receiver cavity, a second receiver surface gap that electromagnetically couples an external surface of the conductive tool body to the second receiver annular cavity, and a second receiver high magnetic permeability material in the second receiver annular cavity. The system may include a second receiver module coupled to opposite sides of the second receiver surface gap to detect currents induced around the second receiver annular cavity. The conductive tool body may include a second transmitter that includes a second transmitter annular cavity that encircles the conductive tool body, a second transmitter surface gap that encircles the conductive tool body and electromagnetically couples the second transmitter annular cavity to an external surface of the conductive tool body, and a second transmitter ring of high magnetic permeability material in the second transmitter annular cavity. The conductive tool body may include a second receiver that includes a second receiver cavity, a second receiver surface gap that electromagnetically couples the external surface of the conductive tool body to the second receiver annular cavity, and a second receiver high magnetic permeability material in the second receiver annular cavity. The apparatus may include a second transmitter module coupled to opposite sides of the second transmitter surface gap to induce an electric current around the second transmitter annular cavity. The apparatus may include a second receiver module coupled to opposite sides of the second receiver surface gap to detect currents induced around the second receiver annular cavity. The first receiver annular cavity may be a large cavity and the second receiver annular cavity is a small cavity, wherein the large cavity is at least 10 percent larger than the small cavity. The first receiver and the second receiver may be longitudinally between the first transmitter and the second transmitter on the conductive tool body. The first transmitter and the second transmitter may be symmetrically located around the first receiver and the second receiver. The system may include a processor coupled to the first receiver module to calculate resistivity based on a signal received from the first received from the first receiver module. The first receiver module may include a high impedance load.

In one aspect, an apparatus includes a conductive tool body. The apparatus includes a first magnetic cavity transmitter in the conductive tool body. The apparatus includes a first magnetic cavity receiver in a member coupled to the conductive tool body. The apparatus includes a first transmit module coupled to the first magnetic cavity transmitter. The apparatus includes a first receiver module coupled to the first magnetic cavity receiver.

Implementations include one or more of the following. The member may be a stabilizer.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus comprising:
a conductive tool body comprising:
a first transmitter comprising:
a first transmitter annular cavity that encircles the conductive tool body,
a first transmitter surface gap that encircles the conductive tool body and electromagnetically couples the first transmitter annular cavity to an external surface of the conductive tool body, and
a first transmitter ring of high magnetic permeability material in the first transmitter annular cavity;
a first receiver comprising:
a first receiver annular cavity,
a first receiver surface gap that electromagnetically couples the external surface of the conductive tool body to the first receiver annular cavity, and
a first high magnetic permeability material in the first receiver annular cavity;
a first transmitter module coupled to opposite sides of the first transmitter surface gap to induce an electric current around the first transmitter annular cavity; and
a first receiver module coupled to opposite sides of the first receiver surface gap to detect currents induced around the first receiver annular cavity.

2. The apparatus of claim 1 wherein the first transmitter emulates a toroid transmitter and the first receiver emulates a toroid receiver.

3. The apparatus of claim 1 further comprising:
a second transmitter in the conductive tool body; and
a second transmit module coupled to the second transmitter.

4. The apparatus of claim 1 further comprising:
a second receiver in the conductive tool body; and
a second receive module coupled to the second receiver.

5. The apparatus of claim 1 further comprising:
a second transmitter in the conductive tool body;
a second receiver in the conductive tool body;
a second transmit module coupled to the second transmitter; and
a second receive module coupled to the second receiver.

6. The apparatus of claim 1 wherein the conductive tool body further comprises:
a second transmitter comprising:
a second transmitter annular cavity that encircles the conductive tool body,
a second transmitter surface gap that encircles the conductive tool body and electromagnetically couples the second transmitter annular cavity to the external surface of the conductive tool body, and
a second transmitter ring of high magnetic permeability material in the second transmitter annular cavity.

7. The apparatus of claim 6 further comprising:
a second transmitter module coupled to opposite sides of the second transmitter surface gap to induce an electric current around the second transmitter annular cavity.

8. The apparatus of claim 1 wherein the conductive tool body further comprises:
a second receiver comprising:
a second receiver cavity,
a second receiver surface gap that electromagnetically couples the external surface of the conductive tool body to the second receiver cavity, and
a second high magnetic permeability material in the second receiver annular cavity.

9. The apparatus of claim 8 further comprising:
a second receiver module coupled to opposite sides of the second receiver surface gap to detect currents induced around the second receiver annular cavity.

10. The apparatus of claim 1, wherein:
the conductive tool body further comprises:
a second transmitter comprising:
a second transmitter annular cavity that encircles the conductive tool body,
a second transmitter surface gap that encircles the conductive tool body and electromagnetically couples the second transmitter annular cavity to the external surface of the conductive tool body, and
a second transmitter ring of high magnetic permeability material in the second transmitter annular cavity;
a second receiver comprising:
a second receiver cavity,
a second receiver surface gap that electromagnetically couples the external surface of the conductive tool body to the second receiver annular cavity, and
a second receiver ring of high magnetic permeability material in the second receiver annular cavity;
the apparatus further comprises:
a second transmitter module coupled to opposite sides of the second transmitter surface gap to induce an electric current around the second transmitter annular cavity; and
a second receiver module coupled to opposite sides of the second receiver surface gap to detect currents induced around the second receiver annular cavity.

11. The apparatus of claim 10 wherein:
the first receiver annular cavity is a large cavity and the second receiver annular cavity is a small cavity, wherein the large cavity is at least 10 percent larger than the small cavity.

12. The apparatus of claim 10 wherein:
the first receiver and the second receiver are longitudinally between the first transmitter and the second transmitter on the conductive tool body.

13. The apparatus of claim 12 wherein:
the first transmitter and the second transmitter are symmetrically located around the first receiver and the second receiver.

14. The apparatus of claim 1 further comprising:
a processor coupled to the first receiver module to calculate resistivity based on a signal received from the first received from the first receiver module.

15. The apparatus of claim 1 wherein the first receiver module comprises a high impedance load.

16. An apparatus comprising:
a conductive tool body;
a first magnetic cavity transmitter in the conductive tool body;
a first magnetic cavity receiver in a member coupled to the conductive tool body;
a first transmit module coupled to the first magnetic cavity transmitter;
a first receiver module coupled to the first magnetic cavity receiver;
wherein the first magnetic cavity transmitter includes:
- a first transmitter annular cavity that encircles the conductive tool body;
- a first transmitter surface gap that encircles the conductive tool body and electromagnetically couples the first transmitter annular cavity to an external surface of the conductive tool body;

wherein the first magnetic cavity receiver includes:
- a first receiver annular cavity;
- a first receiver surface gap that electromagnetically couples the external surface of the member to the first receiver annular cavity; and
- a first high magnetic permeability material in the first receiver annular cavity;

wherein the first transmitter module is coupled to opposite sides of the first transmitter surface gap to induce an electric current around the first transmitter annular cavity; and wherein the first receiver module coupled to opposite sides of the first receiver surface gap to detect currents induced around the first receiver annular cavity.

17. The apparatus of claim 16 wherein the member is a stabilizer.

* * * * *